United States Patent Office 3,337,446
Patented Aug. 22, 1967

3,337,446
EMPLOYING A SUBSTITUTED ULTRAMARINE MINERAL AS A HYDROCRACKING CATALYST FOR HYDROCARBONS
Gordon R. Engebretson, Park Forest, and John Mooi, Homewood, Ill., assignors to Sinclair Research, Inc., New York, N.Y., a corporation of Delaware
No Drawing. Filed Oct. 30, 1964, Ser. No. 407,852
9 Claims. (Cl. 208—111)

This invention concerns novel contact materials which are of special utility in the conversion of heavy petroleum fractions to lower boiling materials. The novel contact material is derived from the mineral ultramarine and generally retains the essential crystalline structure of this mineral. In one embodiment, this invention provides a superior cracking catalyst which also may be used as a support for promoters in a catalyst designed for paraffin isomerization or hydrocarbon hydrocracking. In another embodiment the novel product may be exploited for its hydrogenation-dehydrogenation functions.

Ultramarines are solids having the general formula:

$$M_{x+2/n}Al_xSi_6O_{2x+12}A$$

where M is a metal cation of valence $n$, $x$ is 4 to 6, and A is a divalent anionic moiety containing sulfur or chlorine. Ultramarines are usually found to contain, as the A component, sulfate, chloride or polysulfide moieties: one sulfate radical or two chloride anions or a divalent polysulfide. The polysulfide usually analyzes as about 2 to 6 atoms of sulfur. Sulfur-containing ultramarines, when treated according to the process of this invention, have valuable hydrogenation-dehydrogenation properties.

In ultramarines as usually found, M is sodium or other univalent metal. In this invention, ultramarine is treated to replace about 35% or more of these alkali metal ions with divalent and/or trivalent metal cations preferably without altering the essential crystal structure of the mineral. The resulting product is of utility in petroleum hydrocracking operations. This product also may be associated with amorphous silica-alumina or amorphous silica-magnesia to give a catalyst of superior qualities for a hydrocarbon cracking system which does not employ substantial added hydrogen.

The sodium of the ultramarine will preferably be at least 75% replaced with hydrogen or metals of the IIB alkaline earth or the IIIB type 4$f$ rare earths. Suitable divalent ions are calcium, strontium and barium while in the lanthanide rare earths cerium, lanthanum, neodymium and naturally occurring rare earth mixtures are suitable. Mixtures of different divalent cations with or without one or more trivalent cations may be used to replace sodium. Thus, the contact material may be assigned the general formula:

$$H_hM_iM'_{j/2}M''_{k/3}Al_xSi_6O_{2x+12}A$$

where M' is a divalent metal or mixture of divalent metals and M" is a trivalent metal or mixture of trivalent metals.

$$h+i+j/2+k/3=x+2$$

and

is no greater than about 0.65, preferably less than about 0.25.

When a portion of the original sodium is to be replaced with hydrogen atoms, this may be accomplished by replacing sodium with ammonium, and heating to decompose the ammonium ion. The replacement of sodium may be conveniently brought about by contacting, for example, by soaking, the ultramarine with an aqueous solution of the cation or cations which are to replace the sodium ions. Such a solution is usually made by dissolving a salt of the desired metal in distilled or deionized water. Suitable salts are the chlorides, nitrates or acetates. Excess and extraneous ions will usually be washed out of the mineral before the catalyst is completed. Ordinarily about 50 to 500 grams of the salt or salts are used per liter of water, preferably about 100 to 300 g./l. Enough solution is generally used to give a slurry of catalyst in solution containing about 1 to 20% solids, preferably about 5%.

The sodium of the ultramarine may be replaced during any one of a number of stages in the manufacture of the finished contact material. Ordinarily these stages include grinding or otherwise providing the ultramarine in a small particle size, forming the particles into macro-sized catalyst if desired, associating the ultramarine particles with the amorphous silica-containing gel material and forming, drying, etc., this associated material to its finished size.

The finished contact material can be macrosize, for instance, of bead or tablet form or finely divided form, for use as a fixed, moving or fluidized bed. Often this invention will provide a finely divided (fluid) catalyst, for instance having particles predominantly in the 20 to 100 or 150 micron range to be disposed as a fluidized bed in the reaction zone to which a feed is charged continuously and reacted essentially in the vapor phase. If the contact material is to be used in fixed bed operation it should be formed into particles in which the smallest linear dimension is about $\frac{1}{32}$ inch. This may be accomplished by any standard forming technique, for example extrusion or tabletting. It is sometimes advantageous to mix the mineral with an extender material to facilitate forming, for example, silica or alumina. If such materials are used they will preferably constitute not more than 50% of the composition.

Where the ultramarine is to be associated with an amorphous silica-alumina, or silica-magnesia, the mineral generally will constitute about 1–80% of the finished catalyst, preferably about 5–50%. The ultramarine component will generally be used in a finely divided state achieved by precipitation or grinding. The mineral particles will often be no greater than about 0.1 or 1 micron.

An amorphous silica-alumina portion can be prepared by any conventional technique, such as by addition of sulfuric acid and aluminum sulfate solutions to a sodium silicate solution. The composition of the amorphous silica-alumina phase may be about 5–80% $Al_2O_3$, preferably about 10–50% $Al_2O_3$ with the remainder essentially $SiO_2$.

A silica-magnesia gel can be prepared by adding a magnesium sulfate solution to a silica dispersion. The dispersion will subsequently set to a hydrogel which can be treated with ammonium hydroxide solution, washed and dried to give the gel. A silica dispersion for this preparation is conveniently made by adding sodium silicate solution to a surfuric acid solution. The composition of the silicia-magnesia phase may be about 10–80% MgO, preferably about 15–35% MgO, with the remainder essentially $SiO_2$.

The amorphous phase and mineral phase are mixed at any time when intimate dispersion of the mineral phase in the amorphous phase can be achieved. Preferably, the phases will be mixed before the amorphous phase has been dried. The mineral may also be added during the precipitation of the amorphous phase.

Catalytically promoted cracking of heavier hydrocarbon feedstocks to produce hydrocarbons of preferred octane rating boiling in the gasoline range is widely practiced and presently uses a variety of commercially available solid oxide catalysts to give end products of fairly uniform composition. Cracking is ordinarily effected to produce gasoline as the most valuable product and is generally conducted at temperatures of about 700 to 1100° F., preferably about 850 to 975° F. at pressures up to about 200 p.s.i.g., preferably about atmospheric to 5, 15 or even 100 p.s.i.g. and without substantial addition of free hydrogen to the system. In cracking, the feedstock is usually a mineral oil or petroleum hydrocarbon fraction such as straight run or recycle gas oils or other normally liquid hydrocarbons boiling above the gasoline range. The contact material of this invention is especially useful in cracking hydrocarbon feedstocks having an initial boiling point of about 500° F. or more. Such materials include reduced crudes and other residual stocks, asphalt, the product from butane and/or pentane deoiling of asphalt, etc. A batch, semi-continuous or continuous system may be used, but most often a continuous fluidized system is used. In such system, vaporous cracker effluent is taken overhead and a portion of the catalyst is continuously withdrawn and passed to a regeneration zone where coke or carbon is burned from the catalyst in a fluidized bed by contact with a free oxygen-containing gas before its return to the reaction zone. In a typical operation the catalytic cracking of the hydrocarbon feed would normally result in the conversion of about 40 to 70%, preferably about 50 to 60%, of the feedstock into a product boiling in the gasoline range. The effluent from the cracker conveniently is distilled to isolate the gasoline fraction. Also, products, such as fixed gases, boiling below the gasoline range are removed from the system.

In cracking, coke yield may be held to a minimum through the use of good steam stripping and a high steam partial pressure, and removal of coke from the catalyst is performed by regeneration. Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 5.0%, generally less than about 0.5%. Regeneration puts the catalyst in a substantially carbon-free state, that is, the state where little, if any, carbon is burned or oxygen consumed even when the catalyst is contacted with oxygen at temperatures conducive to combustion.

Hydrocracking is usually performed at a temperature higher than about 750° F. say a temperature in the range of about 750–900° F., preferably about 800–850° F. and a pressure in the range of about 100–10,000 p.s.i.g., preferably about 1000–2000 p.s.i.g. A space velocity of about 0.1 to 10 weight of oil feed per weight of catalyst may be employed. Preferably the WHSV is about 0.25–2.0. Hydrogen is provided from any convenient source and consumption can be in the range of about 2000 to 3000 cubic feet per barrel of charge. The effluent from the hydrogenolysis unit is generally separated by fractionation. In hydrocracking a batch, semi-continuous or continuous system may be used, but most often a continuous system is used.

The invention will be better understood by reference to the following examples, which should be considered illustrative only and not limiting.

*Example I*

500 g. of polysulfide sulfur-containing ultramarine is placed in a ball mill and ground for about 20 hours. The resultant powder is mixed with a crystalline boehmite (AlOOH, indicated by X-ray diffraction analysis to be 85% of 50 A. crystals) in such quantity that the alumina which forms from the boehmite upon calcination of the catalyst accounts for about 20% of the weight of the finished catalyst. Water is mixed with the ultramarine-boehmite mixture until an extrudable dough forms. This dough is extruded using a Welding Engineers twin-worm extruder, having a 1/16 inch diameter die. The extrudate is dried at about 230° F. and broken up to less than ⅜ in. lengths. The extrudate is calcined at about 900° F. in a muffle furnace for about 3 hours.

To the calcined extrudate a solution of 70 g.

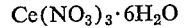
$Ce(NO_3)_3 \cdot 6H_2O$ and 25 g. $NH_4NO_3$ in one liter of deionized water is added. The slurry is agitated slowly for 24 hours. After filtering out the extrudate it is washed repeatedly with deionized water until the washings give no test for $Ce^{+++}$ or $Na^+$. The extrudate is dried and recalcined at 900° F. for 3 hours in a muffle furnace. Analysis of the resulting product shows more than about 15% Ce and less than about 3.5% Na.

200 g. of this catalyst is charged to a 1 inch diameter Universal reactor. The system is pressured up to 1500 p.s.i.g. with hydrogen and the hydrogen rate adjusted. A South West Texas reduced crude (90% boiling above 772° F.) is passed over the catalyst at 1.0 WHSV with the hydrogen rate set at 1500 s.c.f./bbl. The temperature of the catalyst bed is lined out at 820° F. Liquid product effluent is collected and analyzed.

200 g. of a commercial Co—$MoO_3$—$Al_2O_3$ catalyst is then charged to the Universal reactor in place of the ultramarine catalyst and run with the same feed at the same conditions. Analysis shows that the ultramarine catalyst produces more material boiling below 650° F. than does the commercial Co—$MoO_3$—$Al_2O_3$ catalyst.

*Example II*

A silica-alumina hydrogel is prepared by the following technique. 865 ml. of sodium silicate solution (28.8 weight percent $SiO_2$, 40–41.5 Baumé at 68° F. and an $Na_2O/SiO_2$ ratio of 1/3.2) is added to 4,275 ml. of water preheated to 90° F. The batch is stirred for five minutes. With the batch at 90° F., 302 ml. of 34.5 weight percent sulfuric acid solution is added at 182° F. over a period of 45 minutes. A gel forms about 35 minutes after acid addition is begun. The pH is then adjusted to 8.0–8.5, and the batch is agitated for ten minutes.

715 ml. of alum (7.8 weight percent, as $Al_2O_3$) is added to the gel over a period of about 36 minutes and the batch is agitated for an additional five minutes. 205 ml. of sodium aluminate solution (24.4 weight percent as $Al_2O_3$) diluted in 1080 ml. of water is added over a 17-minute period. After all the sodium aluminate is added the pH is about 5.0 to 5.2 and the alumina content of the silica-alumina hydrogel is about 30–31%. This hydrogel is then placed in a drying oven at 230° F. for 10 hours and the resulting granules are washed with warm water until a negative sulfate test is obtained. The granules are dried and ground with a hammer mill to a powder that will pass a 200-mesh screen. The powder is calcined 3 hours at 1000° F. in air.

To 125 g. of 8–20 mesh particles of ultramarine ($Na_8Al_6Si_6O_{24}Cl_2$) a solution of 150 g. $Ce(NO_3)_3 \cdot 6H_2O$ in 500 ml. water is added. The mix is stirred slowly for 24 hours, decanted and washed repeatedly with water to remove uncombined sodium and cerium. The mineral is dried and ground to a powder in a ball mill. Analysis shows more than 17% cerium and less than 9% sodium on an ignited weight basis.

This mineral powder is mixed with a silica-alumina hydrogel as prepared above in a Waring Blendor for 5 minutes. The mixture is placed in a drying oven at 230° F. for 10 hours and the resulting granules are washed with warm water until a negative sulfate test is obtained. The granules are dried and ground with a hammer mill to a powder that will pass a 200 mesh screen. The powder is calcined 3 hours at 1000° F. in air. A comparison of the ultramarine catalyst with a powdered silica-alumina hydrogel without ultramarine is made in a bench-scale catalytic cracking test. The mineral-containing catalyst is found to give a greater yield of material boiling in the gasoline range, and found to show greater selectivity as evidenced by less coke on the catalyst and less hydrogen in the gaseous products.

It is claimed:

1. A contact material consisting essentially of a substituted ultramarine of the general formula:

$$H_hM_iM'_{j/2}M''_{k/3}Al_xSi_6O_{2x+12}A$$

where M is alkali metal cation, M' is divalent group IIB alkaline earth metal ion, M'' is trivalent group IIIB type 4f rare earth ion, $x$ is 4 to 6, $h+i+j/2+k/3=x+2$, $$\frac{i}{x+2}$$

is no greater than about 0.65 and A is a divalent anionic moiety selected from the group consisting of one sulfate radical, two chloride ions and polysulfide of 2 to 6 sulfur atoms.

2. The contact material of claim 1 in which $$\frac{i}{x+2}$$

is no greater than about 0.25.

3. The contact material of claim 1 in which the substituted ultramarine is associated with extender solid material up to about 50% by weight of the total contact material.

4. The contact material of claim 1 in which A is polysulfide.

5. A method for the conversion of a hydrocarbon feedstock boiling above the gasoline range which comprises contacting said feedstock under hydrocracking conditions with the contact material of claim 4 and recovering gasoline components from said contacting.

6. A solid contact material consisting essentially of a substituted ultramarine of the general formula:

$$H_hM_iM'_{j/2}M''_{k/3}Al_xSi_6O_{2x+12}A$$

where M is alkali metal cation, M' is divalent group IIB alkaline earth metal ion, M'' is trivalent group IIIB type 4f rare earth ion, $x$ is 4 to 6, $h+i+j/2+k/3=x+2$, $$\frac{i}{x+2}$$

is no greater than about 0.65 and A is a divalent anionic moiety selected from the group consisting of one sulfate radical, two chloride ions and polysulfide of 2 to 6 sulfur atoms, with which is associated about 1–80% by weight of the contact material of a solid synthetic gel selected from the group consisting of 5–80% alumina, the balance essentially silica and 5–80% magnesia, the balance essentially silica.

7. The contact material of claim 6 in which the synthetic gel is 10–50% alumina, the balance essentially silica.

8. The contact material of claim 6 wherein the contact material contains about 5–50% of the said synthetic gel, the balance essentially substituted ultramarine.

9. A method for the conversion of a hydrocarbon feedstock boiling above the gasoline range which comprises contacting said feedstock under cracking conditions with the contact material of claim 6 and recovering gasoline from said contacting.

References Cited

UNITED STATES PATENTS 3,140,249　7/1964　Plank et al. _____ 208—120
3,140,253　7/1964　Plank et al. _____ 208—120

OTHER REFERENCES

"Short-Cycle Syntheses of Ultramarine Blue," by Kumins et al., pages 567, 568 and 571 of Industrial & Engineering Chemistry, March 1953.

DELBERT E. GANTZ, *Primary Examiner.*

A. RIMENS, *Assistant Examiner.*

UNITED STATES PATENT OFFICE
CERTIFICATE OF CORRECTION

Patent No. 3,337,446                                 August 22, 1967
Gordon R. Engebretson et al.

It is hereby certified that error appears in the above numbered patent requiring correction and that the said Letters Patent should read as corrected below.

Column 6, line 3, for "$H_h M_i M'_{j/2} M''_{k/3} Al_x SiO_6 O_{2x+12} A$"

read -- $H_h M_i M'_{j/2} M''_{k/3} Al_x Si_6 O_{2x+12} A$ --.

Signed and sealed this 1st day of April 1969.

(SEAL)
Attest:

Edward M. Fletcher, Jr.                               EDWARD J. BRENNER
Attesting Officer                                           Commissioner of Patents